US012513448B2

(12) United States Patent
Rezaei

(10) Patent No.: US 12,513,448 B2
(45) Date of Patent: Dec. 30, 2025

(54) AUDIO HEADSET WITH ACTIVE NOISE REDUCTION

(71) Applicant: FOCAL JMLAB, La Talaudiere (FR)

(72) Inventor: Shahin Rezaei, Saint-Etienne (FR)

(73) Assignee: FOCAL JMLAB, La Talaudiere (FR)

( * ) Notice: Subject to any disclaimer, the term of this patent is extended or adjusted under 35 U.S.C. 154(b) by 254 days.

(21) Appl. No.: 18/268,480

(22) PCT Filed: Dec. 23, 2021

(86) PCT No.: PCT/FR2021/052440
§ 371 (c)(1),
(2) Date: Jun. 20, 2023

(87) PCT Pub. No.: WO2022/136807
PCT Pub. Date: Jun. 30, 2022

(65) Prior Publication Data

US 2024/0314487 A1 Sep. 19, 2024

(30) Foreign Application Priority Data

Dec. 24, 2020 (FR) ...................................... 2014116

(51) Int. Cl.
*H04R 1/10* (2006.01)

(52) U.S. Cl.
CPC ......... *H04R 1/1083* (2013.01); *H04R 1/1008* (2013.01); *H04R 1/1075* (2013.01); *H04R 2460/01* (2013.01); *H04R 2460/11* (2013.01)

(58) Field of Classification Search
CPC .............. H04R 1/1083; H04R 2460/01; H04R 2460/11; H04R 1/2819; H04R 1/2826;
(Continued)

(56) References Cited

U.S. PATENT DOCUMENTS 8,447,058 B1 5/2013 Sung et al.
2014/0169579 A1* 6/2014 Azmi .................. H04R 1/1083 381/71.6
(Continued)

FOREIGN PATENT DOCUMENTS

CN 108810703 A 11/2018
EP 3447762 A1 2/2019
(Continued)

OTHER PUBLICATIONS

ISA/EPO International Search Report and Written Opinion for corresponding International Application No. PCT/FR2021/052440 dated Apr. 20, 2022 (13 pages).

*Primary Examiner* — Carolyn R Edwards
*Assistant Examiner* — Friedrich Fahnert
(74) *Attorney, Agent, or Firm* — Harris Beach Murtha Cullina PLLC

(57) ABSTRACT

The invention relates to an active noise-cancelling audio headphones having two circum-aural earpieces, comprising a partition designed to face an ear; said partition incorporating at least one vent passing through said partition so as to generate intentional leaks having a length greater than 1.5 mm and a width selected in such a way that there are either
a ratio between said length and said width is less than or equal to 8:1 if a median section is greater than 1.7 $mm^2$; or
a ratio between said length and said width is less than or equal to 4:1 if said median section is less than 1.7 $mm^2$.

10 Claims, 11 Drawing Sheets

(58) Field of Classification Search
CPC ... G10K 2210/1081; G10K 2210/3214; G10K 2210/3224; G10K 11/17873; G10K 11/17861
USPC .................................................. 381/71, 71.6
See application file for complete search history.

(56) References Cited

U.S. PATENT DOCUMENTS

| | | | |
|---|---|---|---|
| 2016/0330537 A1 | 11/2016 | Barrentine et al. | |
| 2020/0288251 A1* | 9/2020 | Kuipers | H04R 1/1041 |
| 2021/0043184 A1* | 2/2021 | McCutcheon | G10K 11/17875 |

FOREIGN PATENT DOCUMENTS

| | | |
|---|---|---|
| GB | 2234882 A | 2/1991 |
| WO | WO-2019/109389 A1 | 6/2019 |

* cited by examiner

AUDIO HEADSET WITH ACTIVE NOISE REDUCTION

CROSS-REFERENCE TO RELATED APPLICATIONS

This application is a national stage application under 35. U.S.C. § 371 of PCT Application No PCT/FR2021/052440, filed on Dec. 23, 2021, which claims priority to, and the benefit of French Application No. 2014116 filed on Dec. 24, 2020, which are incorporated herein by reference in their entirety.

TECHNICAL FIELD

The invention concerns active noise-cancelling audio headphones, i.e., headphones with two circum-aural earpieces designed to isolate the user from at least some external noise. To achieve this, each earpiece has at least one microphone associated with a speaker.

The invention may be used in all technical fields where it is necessary to isolate the user from external noise, for example when playing music or protecting a user in a noisy environment.

This invention is particularly useful when there is a leak in the front cavity formed around each of the user's ears by the headset's circum-aural earpieces.

PRIOR ART

In active noise-cancelling audio headphones, each circum-aural earpiece 100 typically comprises a partition 15 associated with a pad 20 to form a front cavity 11 around the user's ear, as shown in the FIG. 1. The partition 15 supports a microphone 14 located in the front cavity 11 and configured to pick up sounds from outside entering the front cavity 11. In addition, the partition 15 is open to allow the integration of a speaker 17 making it possible to generate sound waves which are the opposite of the sounds from outside picked up by the microphone 14.

To limit the sounds from outside penetrating into the front cavity 11, the pad 20, the partition 15 and the speaker 17 form an assembly that is substantially airtight to the external air.

A rear cavity 12 may also be formed by a shell 16 intended to protect and integrate the electronic components, such as a sound controller emitted by the speaker 17.

The speaker 17 is preferably integrated into an intermediate cavity 13 to form an acoustic load for adjusting the directivity of the speaker 17. To do this, the motor 19 is integrated into the intermediate cavity 13 and the membrane 18 extends radially at the level of the partition 15.

The tuning of this acoustic load may be obtained with a portion of low or high front acoustic impedance 21, for example micro-perforations made in the partition 15 between the front cavity 11 and the intermediate cavity 13. Similarly, to achieve acoustic tuning between the intermediate cavity 13 and the rear cavity 12, a rear wall 29 of the intermediate cavity 13 is typically provided with a portion of intermediate low acoustic impedance 22 and/or with a vent 27.

The shell 16 may be rendered acoustically transparent by means of a vent or rear low-impedance portion 23 provided in the shell 16.

It is also known to use a front vent 101 connecting the front cavity 11 to the rear cavity 12 to balance the static pressure between the front cavity 11 and the exterior of the earpiece 100. It is typically advisable to size this vent beforehand 101 to avoid degrading the earpiece's transfer function.

The transfer function of an earpiece corresponds to the difference between the signal transmitted to the speaker 17 and the sound actually generated in the front cavity 11 for different frequencies. To obtain this transfer function, it is possible to use the set-up illustrated in FIG. 2, in which the headphones are perfectly positioned over the listening ports of a mannequin 32. These mannequin 32 listening ports simulate the behavior of a user's middle ear using, for example, a torsion simulator. The signal picked up by these listening ports is transmitted to an amplifier 33.

For each frequency, an audio control unit 30 generates a signal S for the frequency in question, and picks up a signal Dut corresponding to the measurement taken at the output of the amplifier 33. The signal S is reinjected at the input of the audio control unit 30 to obtain a reference signal Ref.

The audio control unit 30 is connected to a computer 31 performing the comparison between the reference signal Ref and the measured signal Dut for each frequency analyzed so as to obtain the transfer function.

Alternatively, instead of using the listening ports, it is possible to reuse the signal from the microphone 14 present in the front cavity 11, as shown in FIG. 3. Thus, by connecting the audio control unit 30 to the signal from this microphone 14, it is also possible to obtain the transfer function.

An example of a transfer function is plotted in FIG. 4 between 10 Hz and 20 kHz for an earpiece having a front vent 101 from the prior art, as illustrated in FIG. 1. More specifically, FIG. 4 illustrates two transfer functions: a transfer function measured while the front vent 101 is open; and a transfer function measured while the front vent 101 is closed.

For each transfer function, the variation in amplitude and phase between the Ref and Dut signals reveals the behavior of all the acoustic and electroacoustic elements, such as the characteristics of the speaker, the microphone, the volumes, vents, and portions of low or high acoustic impedance.

As illustrated in FIG. 4, the presence of the front vent 101 in a prior art earpiece does not modify the transfer function thereof since the amplitude and phase curves are superimposed.

In addition to the transfer function, the front vent 101 of the prior art is also sized to have a low cut-off frequency. For example, the front vent 101 has a length of 21.5 mm and a section of 2.26 $mm^2$.

The cutoff frequency may be approximated by a simplified analogy with an RC electric circuit, in which the resistor is called acoustic mass Ma and the capacitor is called acoustic compliance of the front volume Cfv of the front cavity 11, the cutoff frequency Fc of a cylindrical vent may be determined with the following formula:

$$Fc = \frac{1}{2\pi\sqrt{M_a \cdot C_{fv}}} \quad \text{[Math 1]}$$

The acoustic mass Ma may be obtained from the section S and the length L of the vent, using the air density ρ, with the following formula:

$$M_a = \rho\frac{L}{S} \quad \text{[Math 2]}$$

The acoustic compliance of the front volume of the vent Cfv may be estimated from the Vfv volume of the front cavity 11 and the speed of sound c with the following formula:

$$Cfv = \frac{V_{fv}}{\rho \cdot c^2} \quad \text{[Math 3]}$$

Estimation of the Vfv volume of the front cavity 11 is preferably carried out without taking into account the volume of the ear present in the front cavity 11 and by making the approximation that the pad 20 is not compressed. Thus, the Vfv volume of the front cavity 11 may be estimated by considering a flat surface positioned on the pad 20 and by estimating the volume Vfv between the flat surface, the partition 15, and the pad 20 without taking into account the volume of the different vents.

However, the partition 15 may have recesses which should be taken into account in the estimation of the Vfv volume of the front cavity 11.

With this method, the Vfv volume of the front cavity 11 of the earpiece 100 of FIG. 1 may be estimated at 62.4 $cm^3$.

This estimation of the Vfv volume of the front cavity 11 makes it possible to determine the cut-off frequency Fc with the following formula:

$$Fc = \frac{c}{2\pi\sqrt{\frac{L \cdot V_{fv}}{S}}} \quad \text{[Math 4]}$$

With a Vfv volume of the front cavity 11 of 62.4 $cm^3$, and a front vent 101 having a length of 21.5 mm and a section of 2.26 $mm^2$, the cutoff frequency Fc of the front vent 101 of the earpiece 100 of the FIG. 1 is substantially 70 Hz.

For another example, the headphone has a front cavity whose Vfv volume is estimated at 78.6 $cm^3$ as well as a front vent having a length of 7 mm and a section of 1.5 $mm^2$. With this other example, the cutoff frequency of the headphone's front vent may be estimated at 90 Hz.

Furthermore, a major problem with active noise-cancelling audio headphones stems from leaks that may appear between the front cavity 11 and the exterior of the earpiece 100, typically between the user's skin and the pad 20. For example, leaks from the front cavity 11 are generally observed when a pair of glasses is placed on the user's ears, as these glasses degrade the seal provided by the pad. Similarly, leaks may occur when the user has not positioned an earpiece correctly because of hair, a hat, a scar, or any other reason.

Indeed, in a feedback sound suppression system, the sound controller emitted by the speaker is designed by making an approximation that the acoustic system is mostly fixed. If the acoustic system changes phase drastically, for example in the presence of leaks from the front cavity 11, the controller may become unstable and control the generation of undesirable sounds.

To reduce this problem of leakage from the front cavity, modification of the structure of the pads is known so that they deform very significantly as close as possible to the skin, and this deformation forms the most hermetic barrier possible.

However, structural modification of the pads is often insufficient to prevent front cavity leakage and may degrade wearer comfort.

The technical problem to be solved by this invention is to obtain active noise-cancelling audio headphones with an improved transfer function when the front cavity has leaks.

DISCLOSURE OF THE INVENTION

In response to this technical problem, the invention proposes the use of at least one vent to create intentional low-frequencies leakage.

Indeed, the invention stems from an observation according to which the creation of intentional low-frequency leaks makes it possible to limit the degradation of the frequency response due to a defect in the insulation of the front cavity, for example when the user wears eyeglasses.

To obtain effective low-frequency intentional leaks, the research of the invention has shown that it is possible to use at least one vent having:

- a length greater than 1.5 mm; and
- a width selected such that:
  - a ratio between said length and said width is less than or equal to 8:1 if a mid-section is greater than 1.7 $mm^2$; or
  - a ratio between said length and said width is less than or equal to 4:1 if said middle section is less than or equal to 1.7 $mm^2$.

To this end, the invention relates to active noise-cancelling audio headphones having two circum-aural earpieces, each circum-aural earpiece comprising:

- a partition intended to be placed facing one ear;
- a bearing mounted on an outer edge of said partition so as to form a front cavity;
- a shell positioned at the rear of said partition so as to form a rear cavity,
- a speaker mounted on an opening of said partition;
- at least one microphone placed in said front cavity; and
- a noise-cancellation module controlling said speaker to cancel undesirable noise detected by said microphone in said front cavity.

The invention is characterized in that said shell has at least one vent or a portion of low rear acoustic impedance made in said shell so as to make said shell acoustically transparent at low frequencies.

The invention is also characterized in that said partition incorporates at least one vent passing through said partition so as to generate intentional leaks, said at least one vent having:

- a length greater than 1.5 mm; and
- a width selected such that:
  - a ratio between said length and said width is less than or equal to 8:1 if a mid-section is greater than 1.7 $mm^2$; or
  - a ratio between said length and said width is less than or equal to 4:1 if said middle section is less than or equal to 1.7 $mm^2$.

For the purposes of the invention, the range of frequencies for which the shell is acoustically transparent is determined according to the dimensions of the vent or vents. Typically, the headset may be made acoustically transparent for low frequencies, i.e., below 5000 Hz.

The invention thus makes it possible to obtain active noise-cancelling audio headphones with uniform performance, even when the front cavity has leaks and without modifying the pad.

In doing so, the invention makes it possible to limit undesirable sounds that may appear when a user is wearing glasses or when the pad is not correctly placed.

For the purposes of the invention, a vent configured to generate intentional leakage corresponds to a vent whose opening or closing modifies the measured frequency response of the earpiece. For example, intentional leaks may be characterized by a phase shift of at least 5 deg over a frequency range of at least 10 Hz between 20 Hz and 200 Hz between the transfer functions of said circum-aural earpiece, measured when said at least one vent is opened and closed. On the contrary, as described in the prior art, if the phase shift between the transfer functions is less than deg, then the vent does not generate intentional leaks. When multiple vents are used to generate intentional leaks, the total phase shift may be measured when all vents are simultaneously open and closed. The partial phase shift related to a specific vent may be measured by closing all the vents and by opening and closing the vent whose shift is to be calculated.

Preferably, intentional leaks are characterized by a phase shift of at least 10 deg over a frequency range of at least 20 Hz between 20 Hz and 200 Hz between the transfer functions measured when the vent is open and closed.

Measuring the phase shift over a frequency range of at least 10 Hz or 20 Hz prevents a localized difference in measurement from leading to incorrect vent characterization. For this purpose, transfer functions are preferably measured at each frequency unit between at least 20 Hz and 200 Hz, i.e. at 20 Hz, 21 Hz, 22 Hz, 23 Hz, etc.

Intentional leaks may be created by one or more vents of various shapes. To do this, each vent has a length greater than 1.5 mm, preferably greater than 2 mm. Indeed, the invention stems from an observation that it is not enough to create a simple opening in the partition to generate these intentional leaks and limit the undesirable sounds that may appear when a user is wearing glasses or the pad is not correctly placed. Moreover, a simple opening would have the disadvantage of creating additional distortions at average frequencies.

In addition to length, the invention also stems from the observation that two thresholds in the length-to-width ratio makes it possible to generate effective intentional leakage:

either the ratio between length and width must be less than or equal to 8:1 if the median section is greater than 1.7 $mm^2$; or either the ratio between length and width must be less than or equal to 4:1 if said median section is less than 1.7 $mm^2$.

For the purposes of the invention, the "median section" of a vent corresponds to its section in the middle of the vent height. In the simplest case, the vent may have a cylindrical shape with a constant cross-section. With this cylindrical shape, the width of the vent corresponds to its diameter.

Nevertheless, the vent may have a shape that is more complex than a simple cylinder. For example, at least one end of the vent may form a bell, i.e., a flared end, to limit disturbances occurring in the air around this end of the vent.

The vent may thus have the shape of a nozzle with two flared ends.

The vent geometry may also be sized to seek a specific vent cut-off frequency, for example, a cut-off frequency between 60 Hz and 1 KHz or between 60 and 300 Hz.

For a cylindrical vent, the cut-off frequency may be determined using the following formula:

$$Fc = \frac{c}{2\pi\sqrt{\frac{L \cdot V_{fv}}{S}}}; \quad \text{[Math 5]}$$

with Vfv corresponding to the volume of the front cavity, L to the length of the vent, and S to its cross-section.

When the vent has a revolving shape with a variable cross-section, the cut-off frequency is determined using the following formula:

$$Fc = \frac{c}{2\pi\sqrt{\frac{L \cdot V_{fv}}{S'}}}; \quad \text{[Math 6]}$$

with Vfv corresponding to the volume of the front cavity, L to the length of the vent and S' to its average cross-section.

When several vents are used, the cutoff frequency is measured independently for each vent, for example, by closing the other vents. In fact, this formula does not allow us to measure the cut-off frequency generated by the combination of several vents. To estimate the cut-off frequency of several vents, it is possible to determine the cut-off frequency of several vents by measuring the Bode diagram of the vents.

In addition to its shape, the acoustic behavior of the vent may also be adapted by selecting the position of the vent, for example closer or further away from the speaker. The vent may open into a rear frontal cavity or directly outside the earpiece, thus presenting separate acoustic behaviors.

According to one embodiment, the acoustic behavior of the vent is adapted by forming a bell or by placing a resistive mesh on a terminal end of the vent forming a portion of low or high acoustic impedance. For example, a resistive mesh can be formed by a fabric, provided with holes, glued to the end of the vent opening into the front cavity.

Intentional leaks may be achieved by means of a single vent.

Preferably, each circum-aural earpiece has several juxtaposed vents of separate lengths. In fact, by using several vents with different shapes, it is possible to combine the impact of these vents to generate these intentional leaks and limit undesirable sounds.

In particular, it has been found that the embodiment in which each circum-aural earpiece has two juxtaposed vents of different lengths offers a very good compromise between performance and space-saving.

BRIEF DESCRIPTION OF FIGURES

The manner of carrying out the invention as well as the advantages which result from it, will clearly emerge from the embodiments which follow, given by way of indication but not limitation, in support of the appended figures in which.

DETAILED DESCRIPTION OF THE INVENTION

Figure 5:
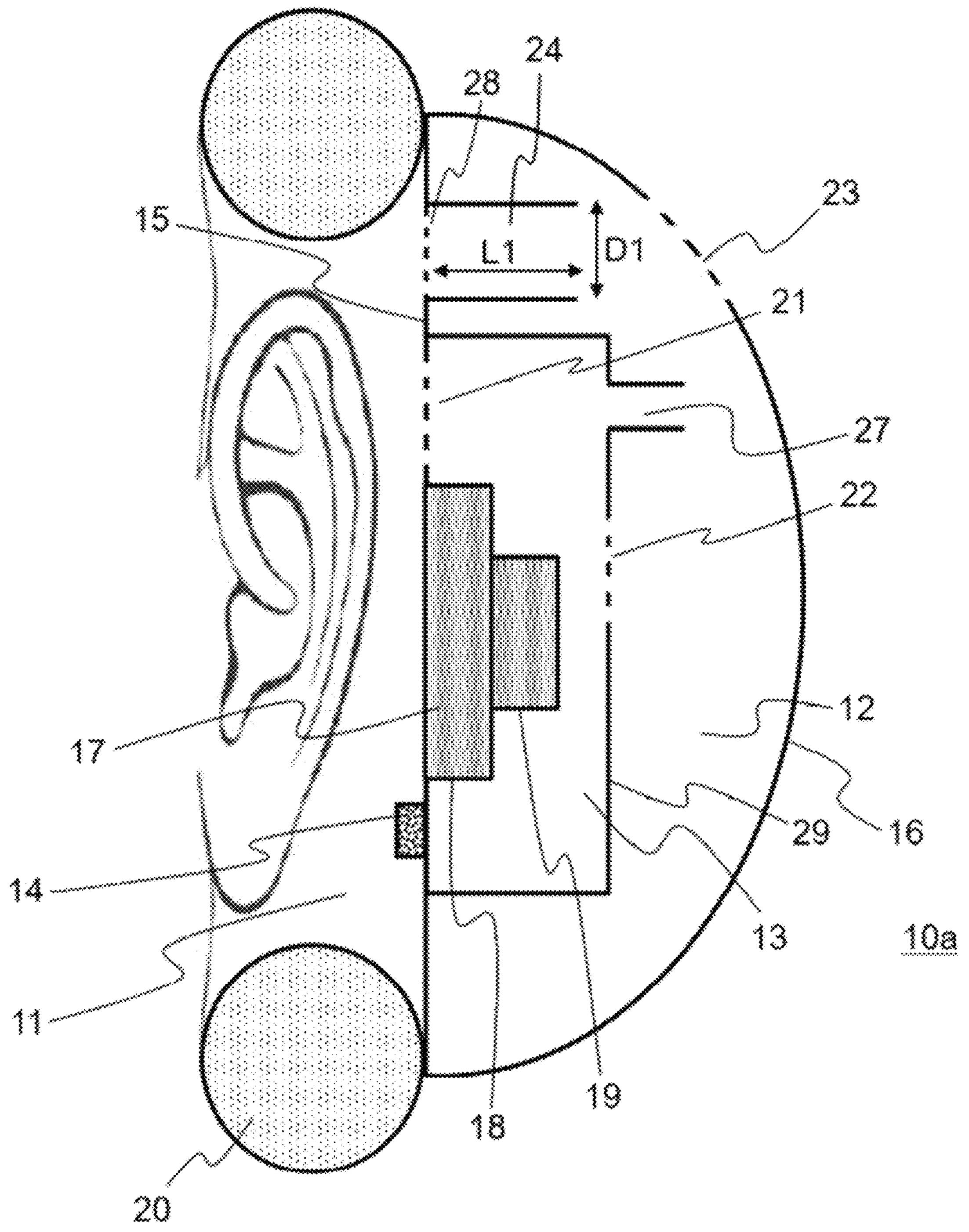
FIG. 5 is a schematic cross-cut view of an earpiece according to a first embodiment of the invention with one vent.

FIG. 5 illustrates a circum-aural earpiece 10*a* of an active noise-cancelling audio headphone. The circum-aural earpiece 10*a* typically comprises a partition 15 linked to a pad 20 to form a front cavity 11 around the user's ear. The partition 15 supports a microphone 14 placed within the front cavity 11 and configured to pick up sounds from the outside penetrating into the front cavity 11.

In addition, the partition 15 is open to allow the integration of a speaker 17 making it possible to generate sound waves which are the opposite of the sounds from outside picked up by the microphone 14. To do this, a noise-cancellation module, for example, an analog or digital signal processor, controls the speaker 17 to suppress undesirable noise detected by the microphone 14 in the front cavity 11. Undesirable noises correspond to sounds picked up in the front cavity 11 which are not generated by the speaker 17.

To limit the sounds from outside penetrating into the front cavity 11, the pad 20, the partition 15, and the speaker 17 form a substantially airtight assembly.

The circum-aural earpiece 10*a* also has a shell 16 positioned at the rear of the partition 15 so as to form a rear cavity 12 between the partition and the internal wall of shell 16. This rear cavity 12 is intended to protect and integrate electronic components, such as a sound controller emitted by the speaker 17, the latter integrating, for example, the noise-cancellation module.

The speaker 17 is preferably integrated into an intermediate cavity 13 formed between partition 15 and shell 16. This intermediate cavity 13 is used to form an acoustic load making it possible to adjust the directivity of the speaker 17. To do this, the motor 19 is integrated into the intermediate cavity 13 and the membrane 18 extends radially at the partition wall 15.

The tuning of this acoustic load may be obtained with a portion of low or high front acoustic impedance 21, for example micro-perforations made in the partition 15 between the front cavity 11 and the intermediate cavity 13. Similarly, to achieve acoustic tuning between the intermediate cavity 13 and the rear cavity 12, a rear wall 29 of the intermediate cavity 13 is typically provided with a portion of intermediate low acoustic impedance 22 and/or with a vent 27.

The shell 16 is rendered acoustically transparent at low frequencies by means of a vent or rear low-impedance portion 23 provided in the shell 16.

Figure 1:
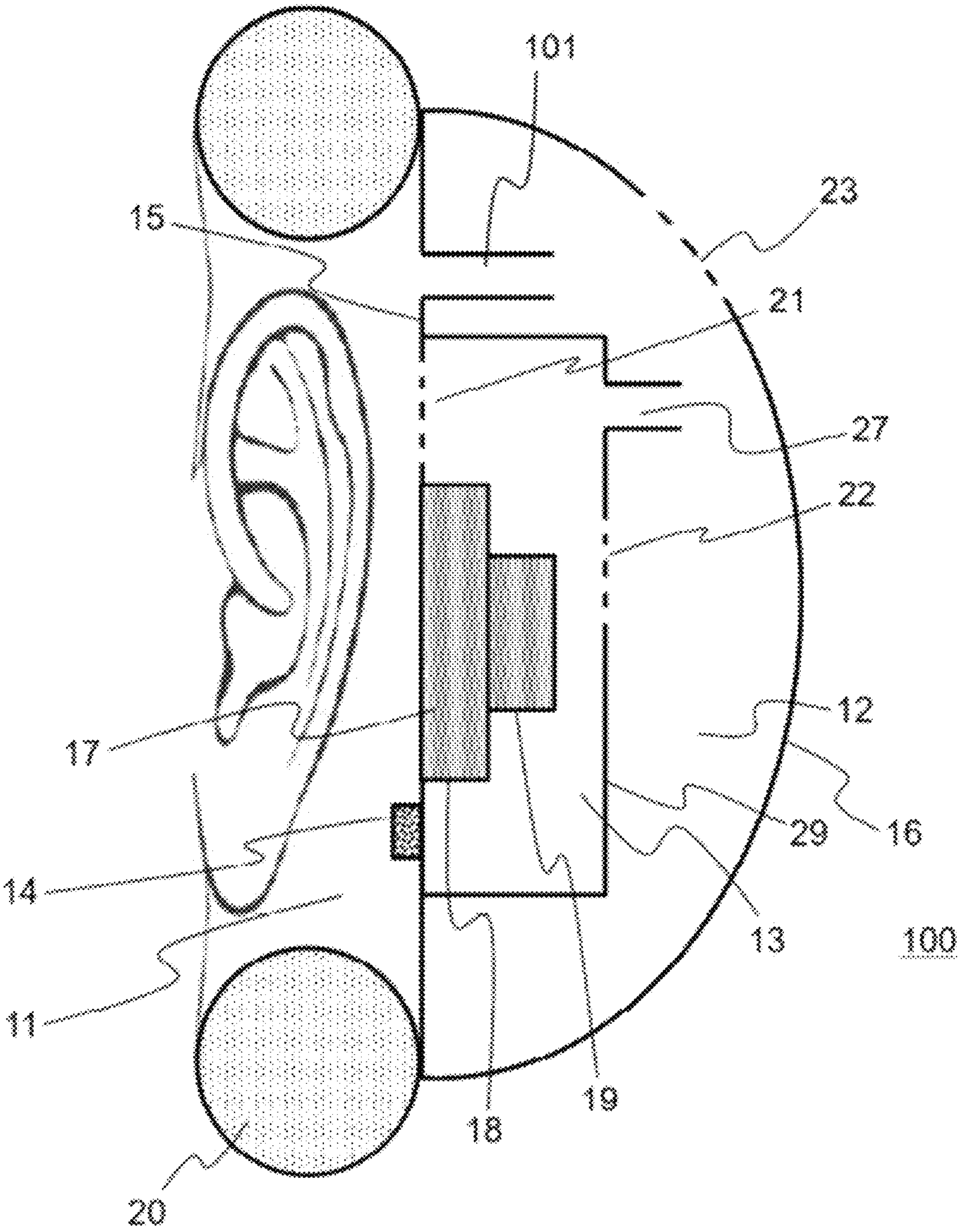
Prior Art Fig. 1
FIG. 1 is a schematic cross-cut view of an earpiece of the prior art.

In addition, the earpiece 10*a* of FIG. 5 differs from the earpiece 100 of FIG. 1 of the state of the art by the characteristics of the vent 24 passing through the partition 15 between the front cavity 11 and the rear cavity 12.

In the context of the invention, this vent 24 has a length L1 greater than 1.5 mm; and a width D1 selected such that: a ratio between the length L1 and the width D1 is less than or equal to 8:1 if a middle section is greater than 1.7 $mm^2$; or a ratio between the length L1 and the width D1 is less than or equal to 4:1 if the middle section is less than or equal to 1.7 $mm^2$.

For example, if the vent 24 corresponds to a cylinder having a diameter D1 of 1.4 mm, the median section S is approximately 1.53 $mm^2$, according to the formula $S=\pi D^2/4$. In this example, the middle section S is less than 1.7 $mm^2$, so the length L1 of the vent must be less than 5.6 mm, i.e., 4.D1, so that the ratio of length L1 to width D1 is less than or equal to 4:1. Thus, with a diameter D1 of 1.4 mm, vents 24 of length 4 or 5 mm may be used to generate effective intentional leaks whereas a vent 24 of 6 mm or 10 mm would be less effective.

For another similar example, if the vent 24 corresponds to a cylinder having a diameter D1 of 1.3 mm, the median section S is approximately 1.33 $mm^2$. In this example, the middle section S is still less than 1.7 $mm^2$, so the length L1 of the vent must be less than 5.2 mm, i.e., 4.D1, so that the ratio between the length L1 to the width D1 is less than or equal to 4:1.

For another example with a larger cross-section, if vent 24 corresponds to a cylinder with a diameter D1 of 1.6 mm, median cross-section S is approximately 2 $mm^2$. In this example, the median cross-section S is greater than 1.7 $mm^2$, so the length L1 of the vent must be less than 12.8 mm, i.e., 8.D1, so that the ratio between the length L1 and the width D1 is less or equal to 8:1. Thus, with a diameter D1 of 1.6 mm, vents 24 of length 4, 5, 6 or 10 mm may be used to generate effective intentional leaks whereas a vent 24 of 15 mm would be less effective.

In addition, the dimensions of the vent 24 may be selected so that the vent 24 has a cut-off frequency Fc of between 60 Hz and 1 kHz, or preferably between 60 Hz and 300 Hz, so as to limit the phase shift of the transfer function in case of leaks from the front cavity 11.

Figure 2:
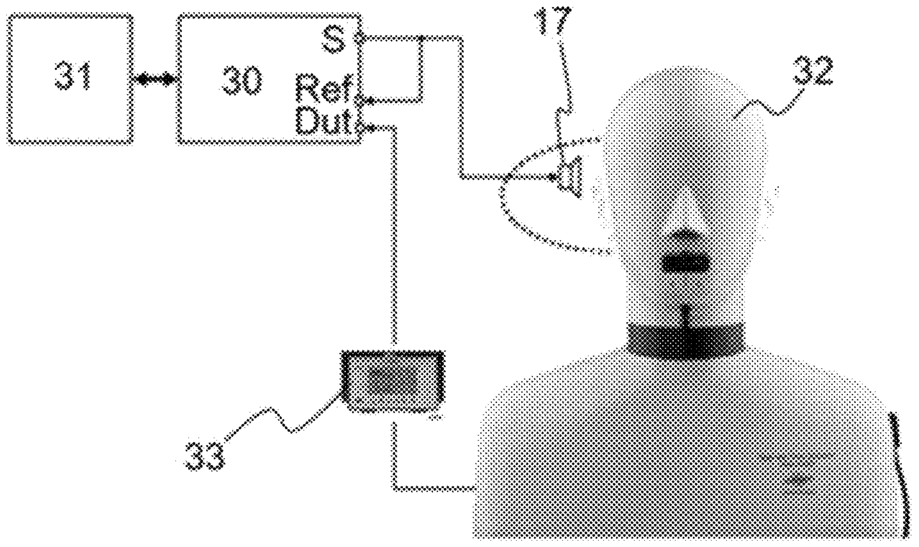
Prior Art Fig. 2
FIG. 2 is a schematic representation of a protocol for measuring a transfer function according to a non-invasive embodiment.

The transfer function of an earpiece corresponds to the difference between the signal transmitted to the speaker 17 and the sound actually generated in the front cavity 11 for different frequencies. To obtain this transfer function, it is possible to use the assembly illustrated in FIG. 2, in which the headphones are perfectly placed on the listening ports of a mannequin 32. These mannequin 32 listening ports simulate the behavior of a user's middle ear by means of a torsion simulator, for example. The signal picked up by these listening ports is transmitted to an amplifier 33.

For each frequency, an audio control unit 30 generates a signal S for the frequency in question, and picks up a signal Dut corresponding to the measurement taken at the output of the amplifier. 33. The signal S is reinjected at the input of the audio control unit 30 to obtain a reference signal Ref.

The audio control unit 30 is connected to a computer 31 performing the comparison between the reference signal Ref and the measured signal Dut for each frequency analyzed so as to obtain the transfer function.

Figure 3:
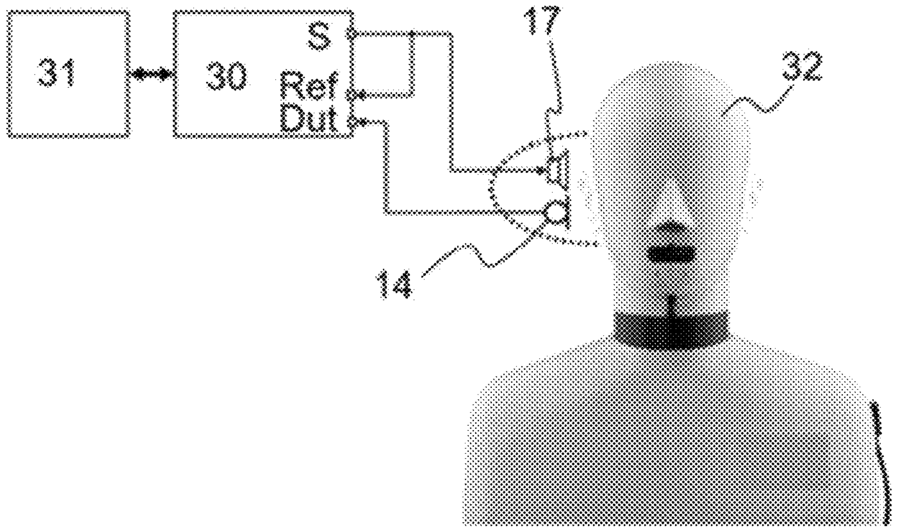
Prior Art Fig. 3
FIG. 3 is a schematic representation of a protocol for measuring a transfer function according to an invasive embodiment.
Figure 4:
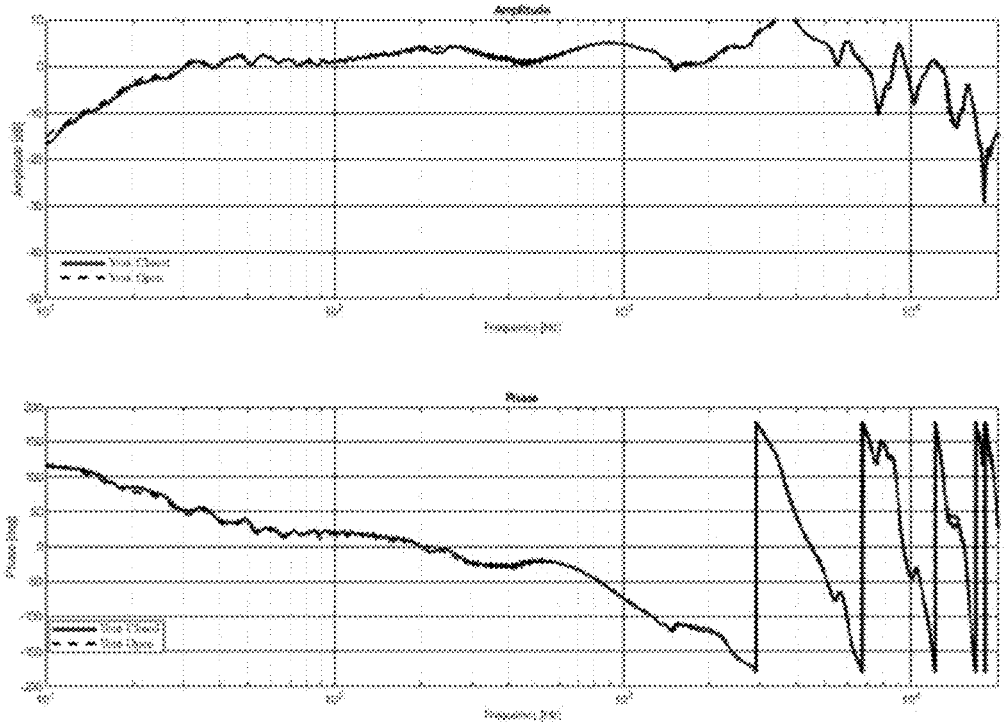
Prior Art Fig. 4
FIG. 4 illustrates the transfer functions, in amplitude and in phase, of the earpiece of FIG. 1 when the prior art vent is open or closed.

Alternatively, instead of using the listening ports, it is possible to reuse the signal from the microphone 14 present in the front cavity 11, as shown in FIG. 3. Thus, by connecting the audio control unit 30 to the signal from this microphone 14, it is also possible to obtain the transfer function.

Figure 7:
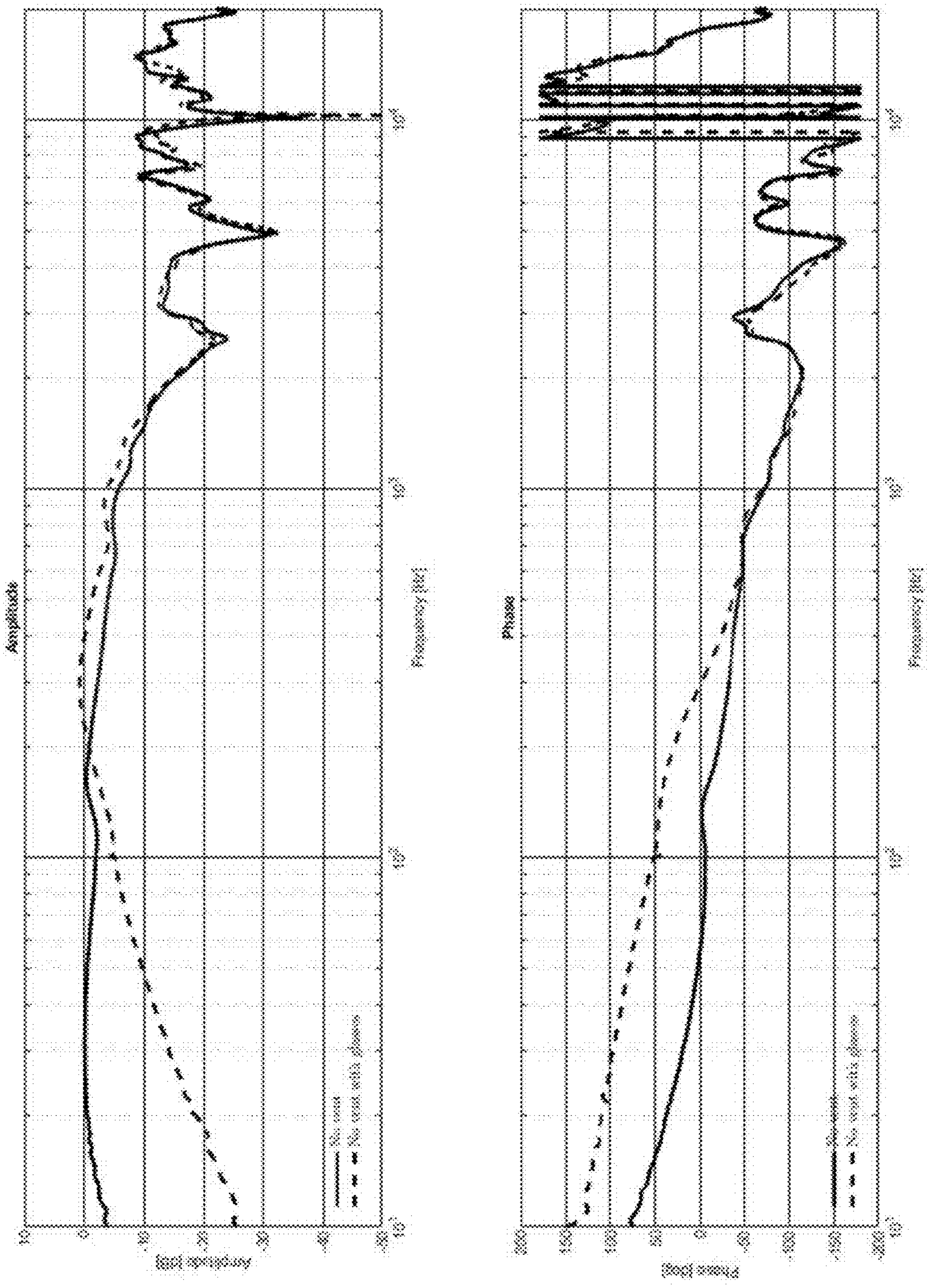
FIG. 7 illustrates the transfer functions, in amplitude and in phase, of the earpiece of FIG. 5, with the closed vent and with or without leaks from the front cavity.

An example of a transfer function is plotted in FIG. 7 between 10 Hz and 20 kHz for the earpiece 10*a* of FIG. 5 while the vent 24 is closed so as to visualize the degradation of the transfer function when the front cavity 11 has leaks with respect to the transfer function when the front cavity 11 is sealed. The presence of leaks may, for example, be simulated by placing glasses on the mannequin 32.

As illustrated in this FIG. 7, below 1 KHz, the transfer functions measured with and without leaks are very different. For example, at 20 Hz, the measured phase of the earpiece 10*a* is deg whereas with leaks the measured phase is 110 deg. The presence of leaks thus induces a phase shift of 70 deg. This phase shift is more than enough to cause controller instability and generate undesirable sounds.

To limit this phase shift, the invention proposes using a vent configured to generate intentional leaks.

Figure 8:
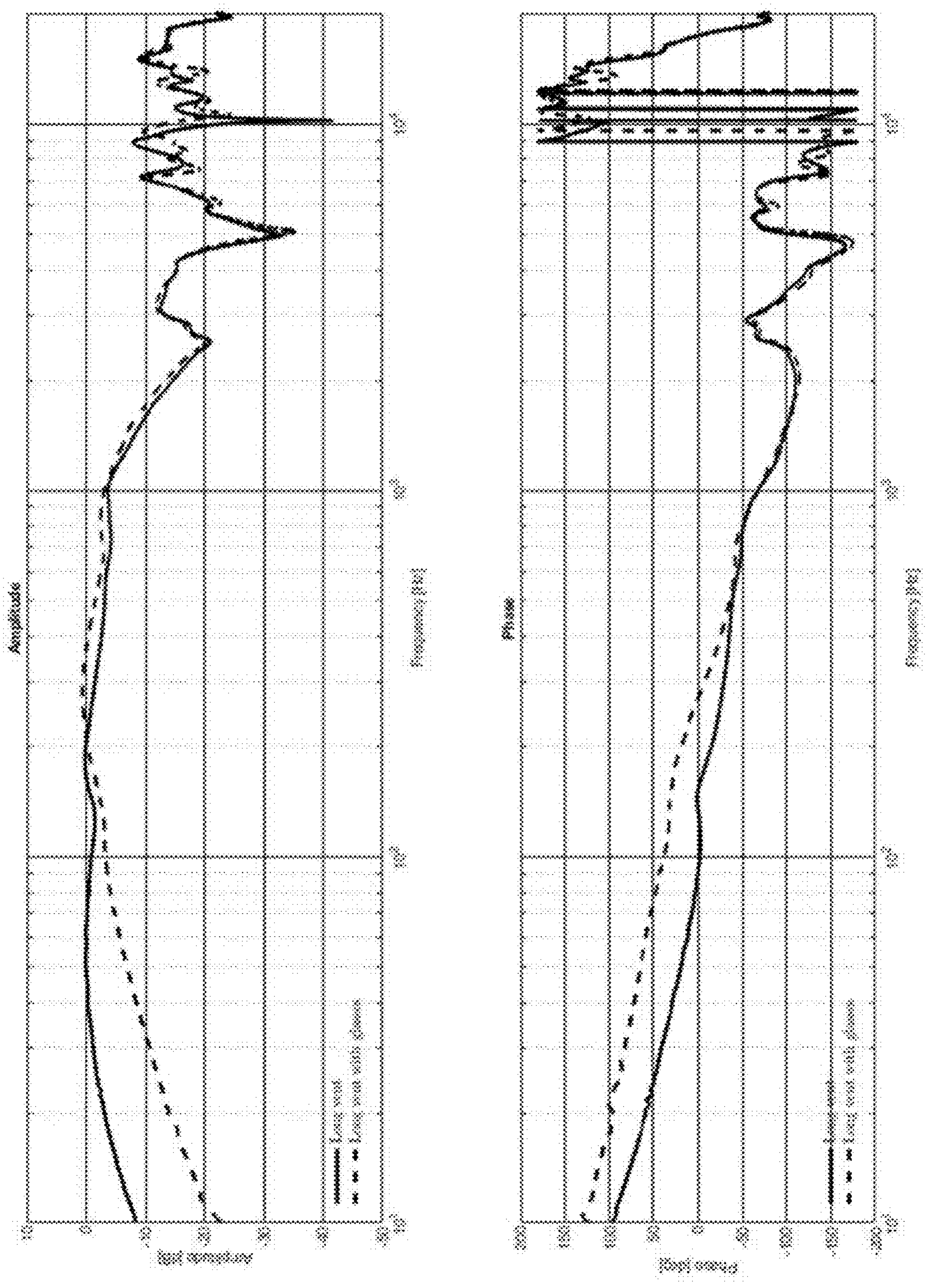
FIG. 8 illustrates the transfer functions, in amplitude and in phase, of the earpiece of FIG. 5 comprising a long vent, with or without leaks from the front cavity.
Figure 9:
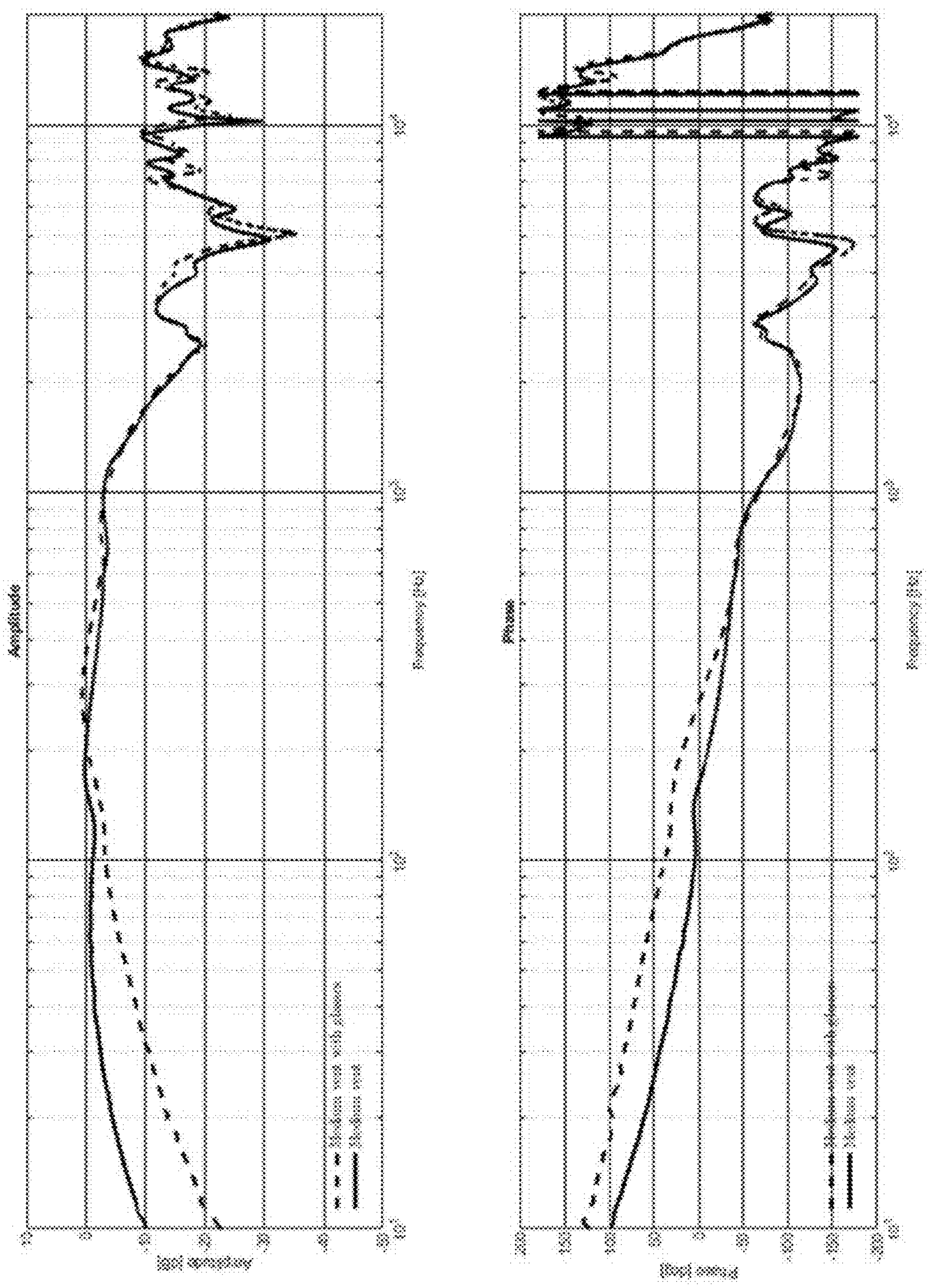
FIG. 9 illustrates the transfer functions, in amplitude and in phase, of the earpiece of FIG. 5 comprising a medium vent with or without leaks from the front cavity.
Figure 10:
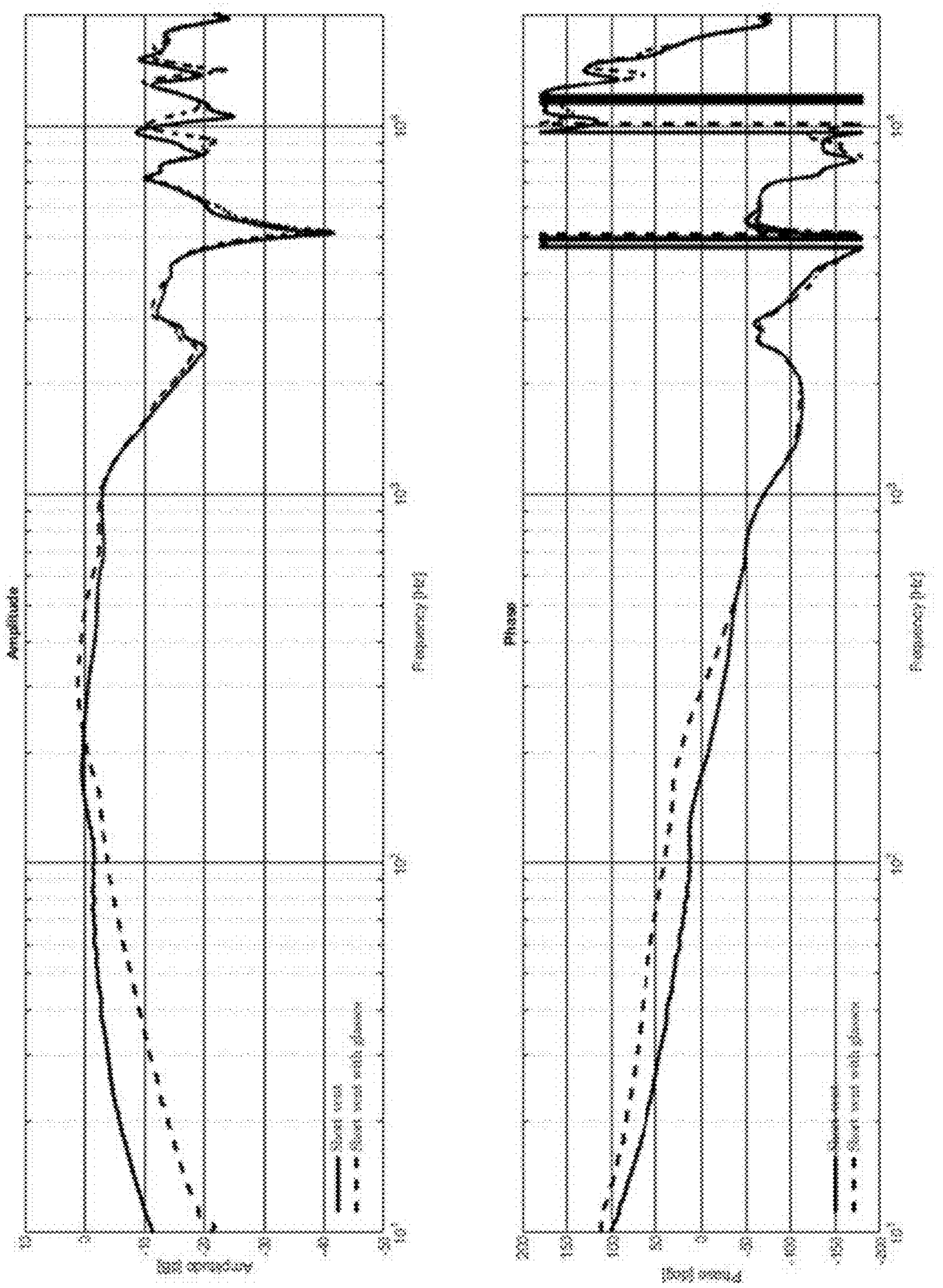
FIG. 10 illustrates the transfer functions, in amplitude and in phase, of the earpiece of FIG. 5 comprising a short vent with or without leaks from the front cavity.

FIGS. 8, 9, and 10 illustrate three examples of measured transfer function, with and without leakage from the front cavity 11, for the same earpiece 10*a* and with three cylindrical vents 24 of the same section S, approximately equal to 1.65 mm$^2$, and presenting different L1 lengths. In these three examples, the front cavity 11 has a Vfv volume of 70 cm$^3$ and the vents 24 have a diameter D1 of 1.45 mm.

Estimation of the Vfv volume of the frontal cavity 11 is preferably carried out without taking into account the size of the ear present in the frontal cavity 11, and assuming that the pad 20 is not compressed. In this way, the Vfv volume of the front cavity 11 may be estimated by considering a flat surface placed on the pad 20 and by estimating the Vfv volume between the flat surface, the partition 15 and the pad 20 without taking into account the volume of the various vents.

In the example of FIG. 8, a cylindrical vent 24 of 10 mm in length L1 is used. The cut-off frequency of this vent 24 of 10 mm length L1 may be estimated at 83.1 Hz using the following formula:

$$Fc = \frac{c}{2\pi\sqrt{\frac{L \cdot V_{fv}}{S}}}; \quad \text{[Math 7]}$$

with Vfv corresponding to the size of the front cavity 11, L1 to the length of the vent 24 and S to its section.

Figure 12:
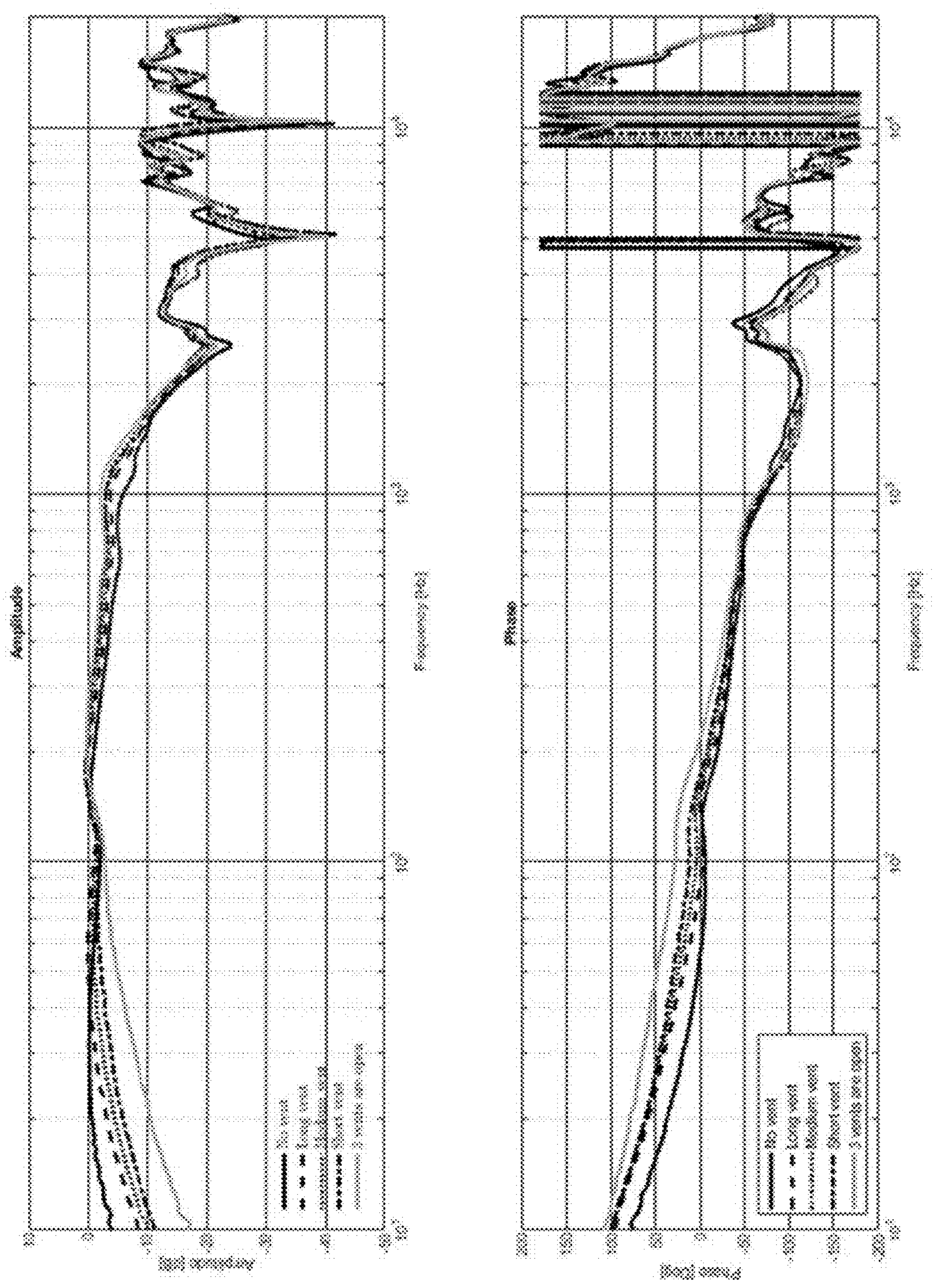
FIG. 12 illustrates the phase shifts linked to the presence or absence of vents on the amplitude and phase transfer functions of an earpiece with zero to three vents.

This vent 24 of 10 mm in length L1 therefore has a cut-off frequency Fc of between 60 Hz and 1 kHz. As illustrated in FIG. 12, it makes it possible to generate intentional leaks. For example, intentional leaks may be characterized by a phase shift of at least 5 deg over a frequency range of at least 10 Hz between 20 Hz and 200 Hz between the transfer functions measured when the vent 24 is open and when the vent 24 is closed.

Preferably, intentional leakage is characterized by a phase shift of at least 10 deg over a frequency range of at least 20 Hz between 20 Hz and 200 Hz between the transfer functions measured when vent 24 is open and when vent 24 is closed.

In fact, FIG. 8 reveals that the phase shift measured without leakage in this vent 24 is reduced with respect to the phase shift measured without leakage and without the presence of this vent, 24, as illustrated in FIG. 7. For example, in FIG. 7, at 20 Hz, the phase measured without leakage is 70 deg without vent 24, whereas the phase measured without leakage is 40 deg in the presence of vent 24. The presence of vent 24 therefore leads to a reduction in the phase shift of 30 deg.

This limitation of the phase shift is all the more marked when the cut-off frequency Fc of the vent 24 is between 60 Hz and 1 kHz.

Indeed, FIG. 9 illustrates the transfer functions of a cylindrical vent 24 with a length L of 6 mm with the same section S of 1.65 mm$^2$. With the same Vfv volume of 70 cm$^3$, the cutoff frequency Fc of this vent 24 is 107.3 Hz. As illustrated in FIG. 9, the phase shift measured with or without leakage with this vent 24 having a cut-off frequency Fc of 107.3 Hz is generally lower than the phase shift measured with the vent 24 having a cut-off frequency Fc of 83.1 Hz, shown in FIG. 8.

Similarly, this phase shift is further reduced when a cylindrical vent 24 with a length L of 4 mm is used, as shown in FIG. 10. With the section S of 1.65 mm$^2$ and the Vvf volume of 70 cm$^3$, this vent 24 with a length L of 4 mm has a cut-off frequency Fc of 131.4 Hz. As illustrated in FIG. 10, the phase shift measured with or without leakage with this vent 24 having a cut-off frequency Fc of 131.4 Hz is generally lower than the phase shift measured with the vent 24 having a cut-off frequency Fc of 107.3 Hz, shown in FIG. 9. For example, at 20 Hz, the phase measured without leakage is substantially 60 deg while the phase measured with leakage is close to 80 deg. This 4 mm vent 24 therefore makes it possible to obtain a phase shift limited to 20 deg contrary to the phase shift of 70 deg measured without using a vent 24 making it possible to generate intentional leaks.

These examples of FIGS. 8 to 10 make it possible to illustrate how to size the characteristics of a vent 24 to generate intentional leaks. Of course, the shape of the vent 24 may vary while configuring the vent 24 to generate intentional leaks. For example, vent 24 can be nozzle-shaped, bell-shaped or any other shape suitable for controlling air propagation. With a revolving shape of variable cross-section, the cut-off frequency Fc is determined using the following formula:

$$Fc = \frac{c}{2\pi\sqrt{\frac{L \cdot V_{fv}}{S'}}}; \quad \text{[Math 8]}$$

with Vfv corresponding to the volume of the front cavity 11, L1 to the length of the vent 24 and S' to its average cross-section.

In addition to the shape of the vent 24, one or more end sections may also be provided with a resistive mesh 28 to adapt the vent's acoustic properties 24.

Figure 6:
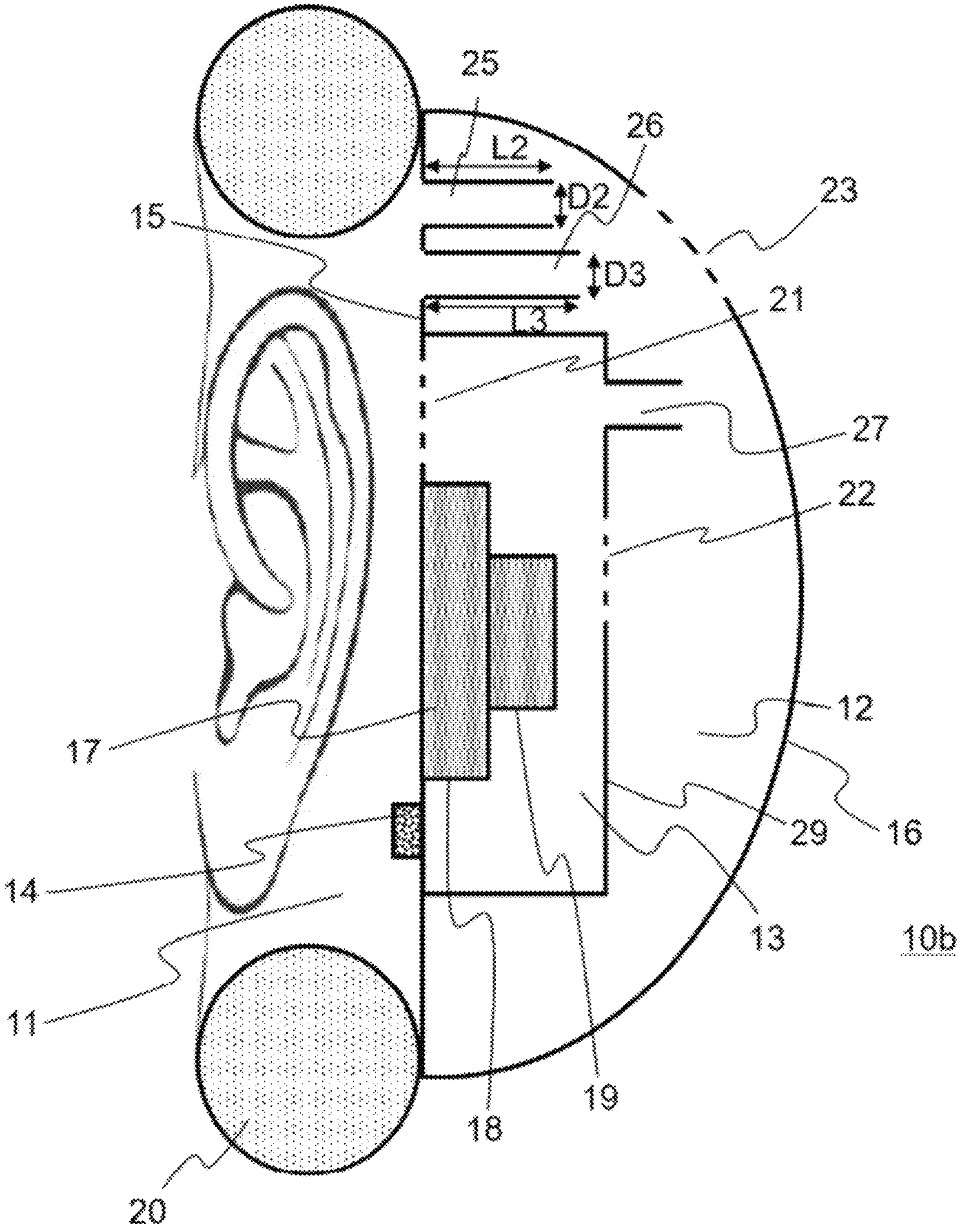
FIG. 6 is a schematic cross-cut view of an earpiece according to a second embodiment of the invention with two vents.

Preferably, several vents 24 may be juxtaposed to obtain an improved phase shift with or without leakage from the front cavity. 11. For example, the FIG. 6 shows a circumaural earpiece 10*b* with two juxtaposed vents, a first vent 25 having a length L2 and a width D$^2$ and a second vent 26 having a length L3 and a width D3.

By way of example, the width D$^2$ of the first vent 25 may be 1.45 mm and the length L2 of the first vent 25 may be 2.7 mm. Similarly, the width D3 of the second vent 26 may be 45 mm and the length L3 of the second vent 26 may be 3.9 mm.

Figure 11:
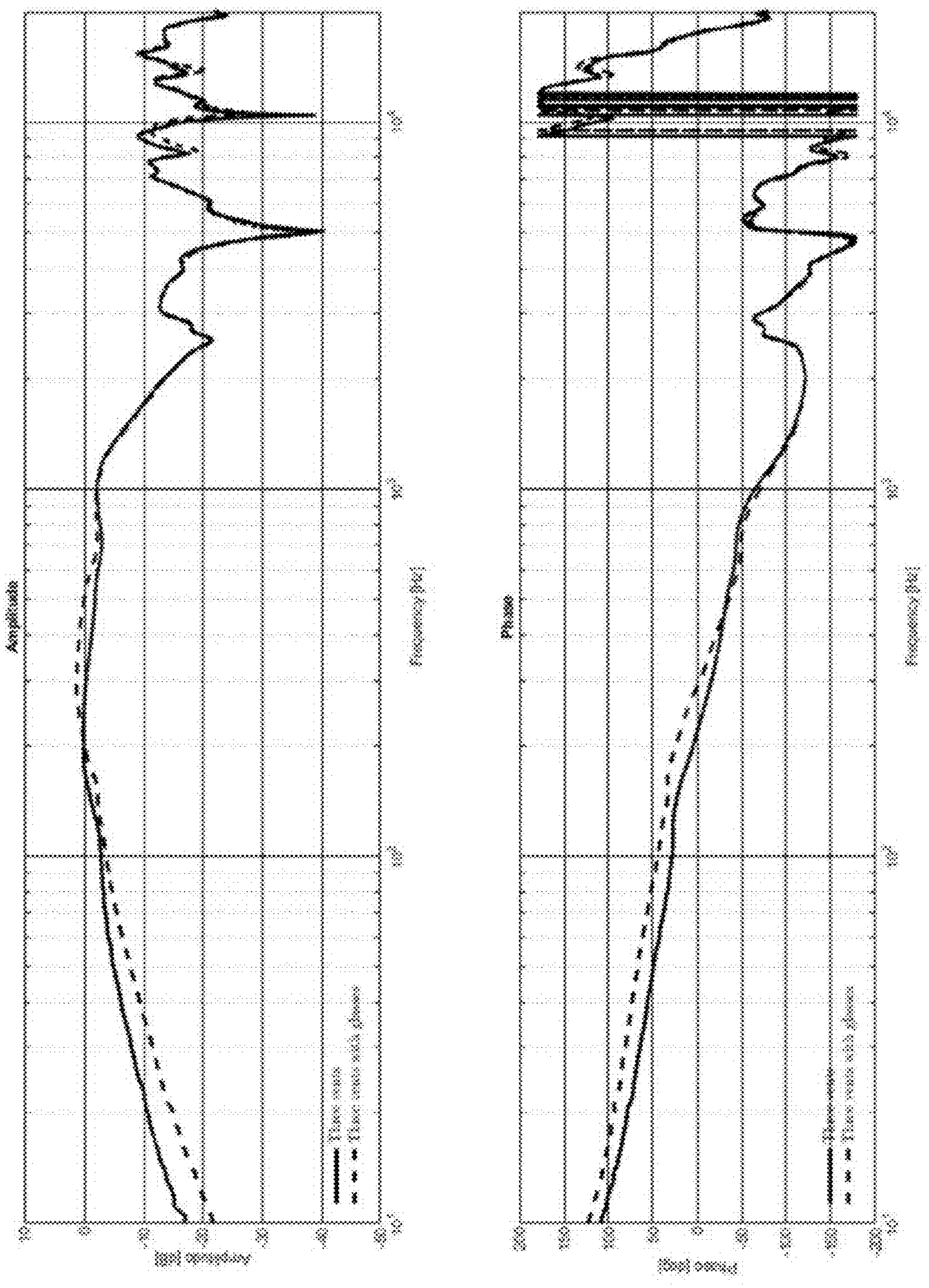
FIG. 11 illustrates the transfer functions, in amplitude and in phase, of an earpiece comprising three vents with or without leaks from the front cavity.

FIG. 11 illustrates the transfer function of an earpiece in which the three vents described with FIGS. 8, 9 and 10 are juxtaposed. This combination of several vents 24 makes it possible to obtain a very limited phase shift between the transfer functions measured with or without leakage from the front cavity 11.

The invention thus makes it possible to limit the phase shift with or without leakage from the front cavity 11 by creating intentional leakages which degrade the response measured when the circum-aural earpiece 10$a$-10$b$ is perfectly placed around the user's ears. However, the invention is based on the observation that this ideal positioning is practically impossible to reproduce in reality, and that it is preferable to produce active noise-cancelling headphones in which the quality of attenuation is better in the majority of cases of use, and in particular in the most degraded cases where leaks are present at the level of the front cavity 11, so as to obtain a limitation of undesirable sounds.

The invention thus makes it possible to guarantee homogeneity in the performance of active noise-cancelling headphones in all situations, by reducing the maximum degradation that can occur in the presence of leakage from the front cavity 11.

The invention claimed is:

1. Active noise-cancelling audio headphones having two circum-aural earpieces, each circum-aural earpiece comprising:

a partition designed to face an ear;

a pad mounted on an outer edge of said partition so as to form a front cavity;

a shell positioned to the rear of said partition so as to form a rear cavity;

a speaker mounted on an opening in said partition;

at least one microphone placed in said front cavity;

and a noise-cancellation module controlling said speaker to suppress undesirable noise detected by said microphone in said front cavity;

characterized in that said shell has at least one vent or rear low acoustic impedance portion formed in said shell so as to render said shell acoustically transparent at low frequencies, and in that said partition incorporating at least one vent passing through said partition and extending between said front cavity and said rear cavity so as to generate intentional leaks, said at least one vent having:

a length greater than 1.5 mm; and a width selected so that:

a ratio between said length and said width is less than or equal to 8:1 if a median section is greater than 1.7 $mm^2$; or a ratio between said length and said width is less than or equal to 4:1 if said median section is less than or equal to 1.7 $mm^2$.

2. Active noise-cancelling audio headphones according to claim 1, wherein said at least one vent has a length greater than 2 mm.

3. Active noise-cancelling audio headphones according to claim 1, wherein said at least one vent has a cylindrical shape.

4. Active noise-cancelling audio headphones according to claim 3, wherein said at least one vent has a cut-off frequency (Fc) between 60 and 300 Hz, said cut-off frequency (Fc) being determined with the following formula:

$$Fc = \frac{c}{2\pi\sqrt{\frac{L \cdot V_{fv}}{S}}};$$

with Vfv corresponding to the volume of said front cavity, L to said length of said at least one vent and S to its cross-section.

5. Active noise-cancelling headphones according to claim 1, wherein said at least one vent has a revolving shape of variable cross-section and a cutoff frequency (Fc) comprised between 60 and 300 Hz, said cutoff frequency (Fc) being determined with the following formula:

$$Fc = \frac{c}{2\pi\sqrt{\frac{L \cdot V_{fv}}{S'}}};$$

with Vfv corresponding to the volume of said front cavity, L to said length of said at least one vent and S' to its average cross-section.

6. Active noise-cancelling audio headphones according to claim 1, wherein said at least one vent has at least one horn-shaped end.

7. Active noise-cancelling audio headphones according to claim 1, wherein said at least one vent has at least one end portion provided with a resistive mesh.

8. Active noise-cancelling audio headphones having two circum-aural earpieces, each circum-aural earpiece comprising:

a partition designed to face an ear;

a pad mounted on an outer edge of said partition so as to form a front cavity;

a shell positioned to the rear of said partition so as to form a rear cavity;

a speaker mounted on an opening in said partition;

at least one microphone placed in said front cavity:

and a noise-cancellation module controlling said speaker to suppress undesirable noise detected by said microphone in said front cavity;

characterized in that said shell has at least one vent or rear low acoustic impedance portion formed in said shell so as to render said shell acoustically transparent at low frequencies, and in that said partition incorporating at least one vent passing through said partition and extending between said front cavity and said rear cavity so as to generate intentional leaks, said at least one vent having:

a length greater than 1.5 mm; and a width selected so that:

a ratio between said length and said width is less than or equal to 8:1 if a median section is greater than 1.7 $mm^2$; or a ratio between said length and said width is less than or equal to 4:1 if said median section is less than or equal to 1.7 $mm^2$, and wherein said intentional leaks are characterized in that a phase shift of at least 5 deg over a frequency range of at least 10 Hz comprised between 20 Hz and 200 Hz between the transfer functions of said circum-aural earpiece, measured when said at least one vent is open and closed.

9. Active noise-cancelling audio headphones according to claim 8, wherein said intentional leaks are characterized in that a phase shift of at least 10 deg over a frequency range of at least 20 Hz comprised between 20 Hz and 200 Hz between the transfer functions of said circum-aural earpiece, measured when said at least one vent is open and closed.

10. Active noise-cancelling audio headphones having two circum-aural earpieces, each circum-aural earpiece comprising:

a partition designed to face an ear;

a pad mounted on an outer edge of said partition so as to form a front cavity;

a shell positioned to the rear of said partition so as to form a rear cavity;

a speaker mounted on an opening in said partition;

at least one microphone placed in said front cavity;

and a noise-cancellation module controlling said speaker to suppress undesirable noise detected by said microphone in said front cavity;

characterized in that said shell has at least one vent or rear low acoustic impedance portion formed in said shell so as to render said shell acoustically transparent at low frequencies, and in that said partition incorporating at least one vent passing through said partition and extending between said front cavity and said rear cavity so as to generate intentional leaks, said at least one vent having:

a length greater than 1.5 mm; and a width selected so that:

a ratio between said length and said width is less than or equal to 8:1 if a median section is greater than 1.7 $mm^2$; or a ratio between said length and said width is less than or equal to 4:1 if said median section is less than or equal to 1.7 $mm^2$, and wherein each circum-aural earpiece comprises two juxtaposed vents having different lengths.

* * * * *